(12) United States Patent
Amano et al.

(10) Patent No.: US 8,482,161 B2
(45) Date of Patent: Jul. 9, 2013

(54) INDUCTIVE POWER SUPPLY SYSTEM WITH OVERLAPPING COILS

(75) Inventors: Yasushi Amano, Aichi-gun (JP); Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 154 days.

(21) Appl. No.: 13/125,188

(22) PCT Filed: Oct. 19, 2009

(86) PCT No.: PCT/IB2009/007150
§ 371 (c)(1),
(2), (4) Date: Jun. 29, 2011

(87) PCT Pub. No.: WO2010/046744
PCT Pub. Date: Apr. 29, 2010

(65) Prior Publication Data
US 2011/0273025 A1 Nov. 10, 2011

(30) Foreign Application Priority Data

Oct. 20, 2008 (JP) .................................. 2008-270153

(51) Int. Cl.
*H01F 27/42* (2006.01)
*H01F 38/00* (2006.01)

(52) U.S. Cl.
USPC ........................................................ 307/104

(58) Field of Classification Search
USPC ........................................................ 307/104
See application file for complete search history.

(56) References Cited

U.S. PATENT DOCUMENTS

| 4,800,328 A | 1/1989 | Bolger et al. |
| 5,646,500 A | 7/1997 | Wilson |
| 6,150,794 A | 11/2000 | Yamada et al. |
| 2005/0093378 A1 | 5/2005 | Ohishi |

FOREIGN PATENT DOCUMENTS

| CN | 1649121 A | 8/2005 |
| DE | 10 2006 044 059 A1 | 4/2008 |
| EP | 0 748 024 A1 | 12/1996 |
| GB | 2 399 228 A | 9/2004 |
| JP | A-63-240331 | 10/1988 |
| JP | A-3-98432 | 4/1991 |
| JP | A-8-126106 | 5/1996 |

(Continued)

OTHER PUBLICATIONS

Jun. 18, 2012 Russian Office Action issued in Russian Patent Application No. 2011115424/11(022919) (with translation).

(Continued)

*Primary Examiner* — Rexford N Barnie
*Assistant Examiner* — Dru Parries
(74) *Attorney, Agent, or Firm* — Oliff & Berridge, PLC (57) ABSTRACT

A power supply coil is provided in a specified area of a power supply station, and a power receiving coil is provided on a vehicle. The power supply coil has a rectangular shape that is long in direction y and the power receiving coil has a rectangular shape that is long in direction x when viewed from the direction of the coil axis. The resonant frequency of the power receiving coil is set to be the same as the resonant frequency of the power supply coil.

7 Claims, 7 Drawing Sheets

FOREIGN PATENT DOCUMENTS

| | | |
|---|---|---|
| JP | A-9-102329 | 4/1997 |
| JP | A-9-172743 | 6/1997 |
| JP | A-10-4638 | 1/1998 |
| JP | A-10-322920 | 12/1998 |
| JP | A-2000-23393 | 1/2000 |
| JP | A-2003-224937 | 8/2003 |
| JP | A-2006-217690 | 8/2006 |
| WO | WO 2007/008646 A2 | 1/2007 |
| WO | WO 2008/051611 A2 | 5/2008 |

OTHER PUBLICATIONS

International Search Report mailed Apr. 12, 2010 issued in International Patent Application No. PCT/IB2009/007150.

Written Opinion of the International Searching Authority mailed Apr. 12, 2010 issued in International Patent Application No. PCT/IB2009/007150.

Feb. 26, 2013 Office Action issued in Japanese Patent Application No. 2008-270153; with partial English-language translation.

INDUCTIVE POWER SUPPLY SYSTEM WITH OVERLAPPING COILS

BACKGROUND OF THE INVENTION

1. Field of the Invention

The invention relates to a power supply system. More particularly, the invention relates to a system that contactlessly supplies power from a power supply coil provided at a facility to a power receiving coil provide on a movable body such as a vehicle.

2. Description of the Related Art

A non-contact power supply system that uses electromagnetic induction is known. For example, Japanese. Patent Application Publication No. 2000-23393 (JP-A-2000-23393) describes a non-contact power supply system that transmits power from a power-supplying primary coil that is housed inside one case to a power-receiving secondary coil that is housed inside another case, by having the secondary coil face the primary coil. The primary and secondary coils are each formed of a magnetic core and a winding. The sectional area of the magnetic core of one of the coils is larger than the outer diameter of the magnetic core of the other coil.

When power is supplied with the primary coil provided at a facility such as a power supply station and the secondary coil provided on a movable body such as a vehicle, the primary coil is provided at a space in which the movable body can park. However, in order to be able to supply power efficiency regardless of where the movable body is parked within the parking space, either the primary coil or the secondary coil must be large, which limits the shape of the space and leads to an increase in cost.

SUMMARY OF THE INVENTION

The invention provides a power supply system capable of efficiently supplying power to a movable body regardless of the position in which the movable body is parked in the parking space.

A first aspect of the invention relates to a power supply system that includes a power supply coil provided in a specified area of a facility, and a power receiving coil which has the same resonant frequency as the power supply coil and is provided on a movable body. When the movable body is positioned within, the specified area, the power receiving coil faces the power supply coil, and the power receiving coil overlaps with or is near the power supply coil when viewed from the direction of the coil axis.

The power supply coil may have a shape with a long axis and a short axis when viewed from the direction of the coil axis, the power receiving coil may have a shape with a long axis and a short axis when viewed from the direction of the coil axis, and the power supply coil and the power receiving coil may be arranged so as to intersect each other when viewed from the direction of the coil axis when the movable body is positioned inside the specified area.

The power receiving coil may have a shape in which the long axis is shorter than the long axis of the power supply coil when viewed from the direction of the coil axis, and the power supply coil and the power receiving coil may be arranged such that the power receiving coil overlaps with or is near the power supply coil when viewed from the direction of the coil axis when the movable body is in the specified area.

The power supply coil may be provided standing upright from the specified area, and the power receiving coil may be provided on a rear portion of the movable body.

The power supply coil may be provided standing upright from the specified area, and the power receiving coil may be provided on a wheel of the movable body.

Accordingly, the invention makes it possible to efficiently supply power to movable body regardless of the position in which the movable body is parked in a specified area (i.e., a parking space).

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Example embodiments of the invention will be described in greater detail below with reference to the accompanying drawings.

In this example embodiment, a vehicle serving as the movable body is stopped in a specified area at a power supply station, where it will receive AC (alternating current) power from a power supply coil. A power supply coil (or primary coil) is provided at the power supply station, and a power receiving coil (or secondary coil) is provided on the vehicle. The power receiving coil is positioned near the power receiving coil, and AC power is supplied to the power supply coil. The power supply coil and the power receiving coil become electromagnetically coupled such that the power receiving coil contactlessly receives AC power. The received AC power is first rectified by a rectifier and then supplied to an on-board battery to charge the on-board battery.

The power supply coil is arranged in a specified area of the power supply station, i.e., in an area where a vehicle is to park. The sectional area of the power supply coil is smaller than the specified area. Also, the power supply coil is arranged in that specified area so that it either overlaps with the power receiving coil or is sufficiently close to the power receiving coil, when viewed from the direction of the coil axis. Also, in order to increase the power supply efficiency, the resonant frequency of the power receiving coil is made to match the resonant frequency of the power supply coil.

Figure 1A:
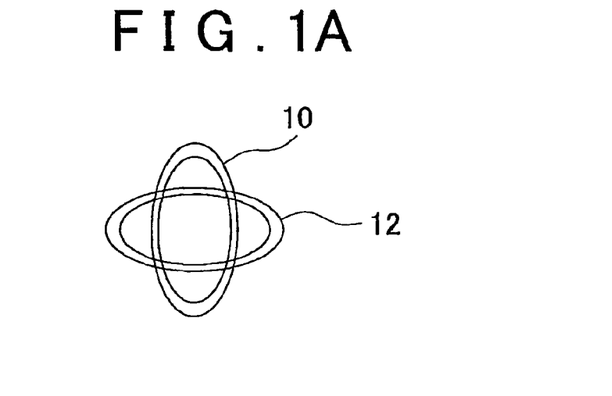
FIG. 1A is a diagram showing one arrangement of a power supply coil and a power receiving coil according to an example embodiment of the invention.
Figure 1B:
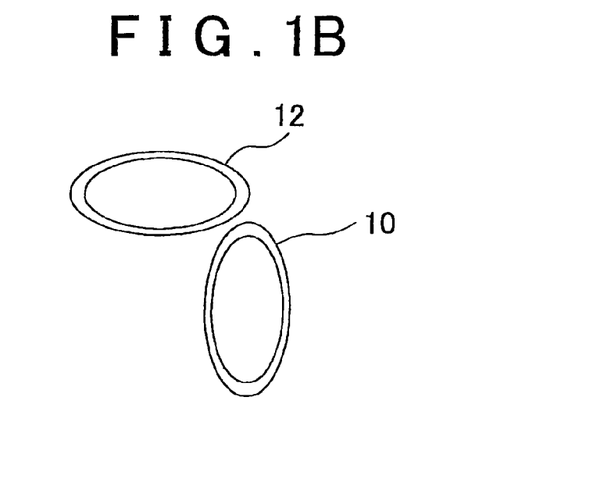
FIG. 1B is a diagram showing another arrangement of the power supply coil and the power receiving coil according to the example embodiment.
Figure 1C:
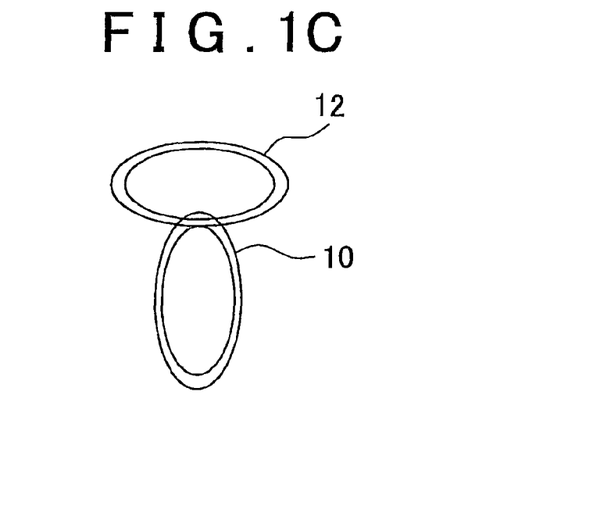
FIG. 1C is a diagram showing yet another arrangement of the power supply coil and the power receiving coil according to the example embodiment.

FIGS. 1A to 1C are diagrams showing the relative positional relationship between the power supply coil 10 and the power receiving coil 12, as viewed from the direction of the coil axis. The resonant frequency of the power receiving coil 12 is the same as the resonant frequency of the power supply coil 10.

FIG. 1A shows a case in which the power receiving coil 12 is arranged overlapping with the power supply coil 10. FIG. 1B shows a case in which the power receiving coil 12 is arranged near, but not overlapping with, the power supply coil 10. FIG. 1C shows a case in which a portion of the power receiving coil 12 is arranged overlapping the power supply coil 10. In FIGS. 1A to 1C, the position of the power supply coil 10 is fixed, while the position of the power receiving coil 12 can be moved because the power receiving coil 12 is provided on the movable body such as a vehicle.

Figure 2:
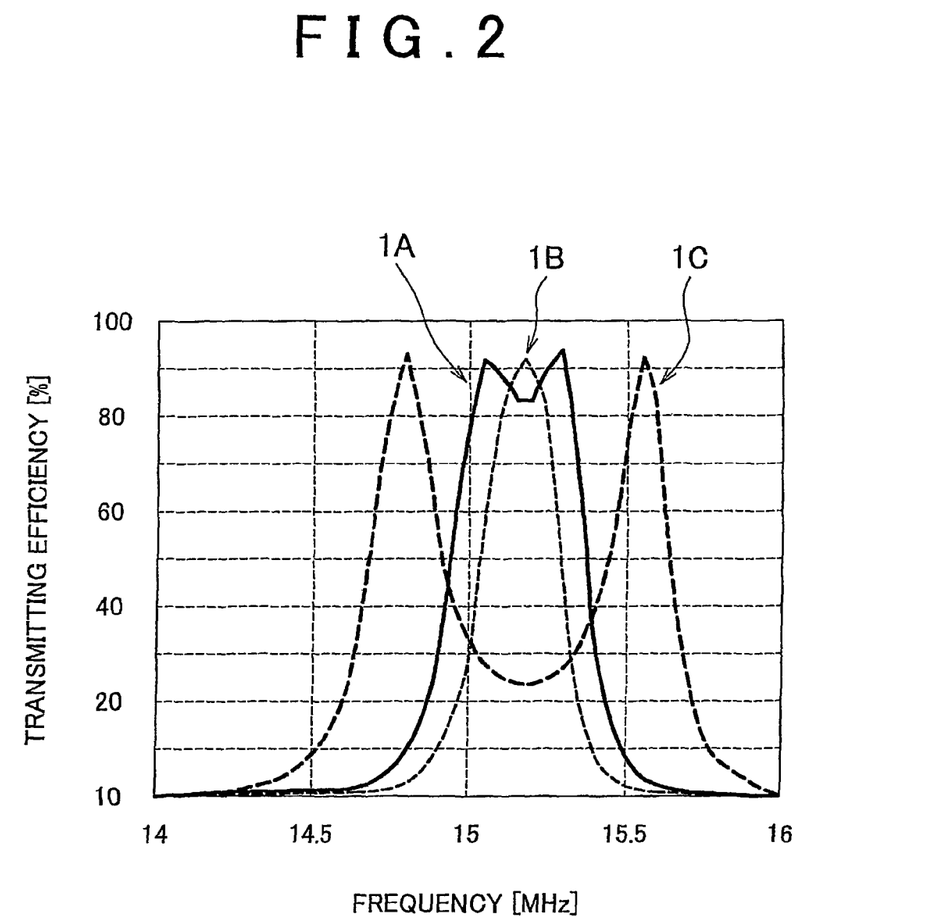
FIG. 2 is a graph showing the relationship between power supply frequency and efficiency.

FIG. 2 is a graph that shows the change in efficiency (i.e., transmitting efficiency) when changing the power supply frequency. In FIG. 2, the line denoted by reference character 1A indicates the efficiency with the arrangement shown in FIG. 1A, the line denoted by reference character 1B indicates the efficiency with the arrangement shown in FIG. 1B, and the line denoted by reference character 1C indicates the efficiency with the arrangement shown in FIG. 1C. With lines 1A and 1C, i.e., with the arrangements shown in FIGS. 1A and 1C, there are two peaks of maximum efficiency, but with line 1B, i.e., with the arrangement shown in FIG. 1B, there is only one peak of maximum efficiency. In all cases, a high efficiency of approximately 90% can be obtained by adjusting the power supply frequency. This means that by making the resonant frequencies of the power supply coil 10 and the power receiving coil 12 the same and arranging the power receiving coil 12 so that it is near, if not at least partially overlapping, the power supply coil 10, power can be supplied at a high efficiency of approximately 90% by adjusting the power supply frequency according to the position of the power receiving coil 12 with respect to the power supply coil 10.

Figure 3A:
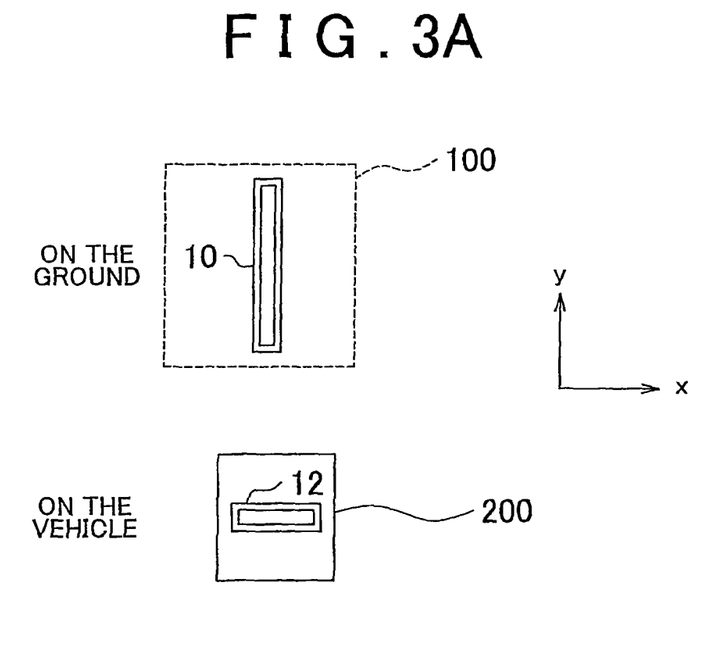
FIG. 3A is a diagram showing one arrangement of the power supply coil and the power receiving coil according to the example embodiment.
Figure 3B:
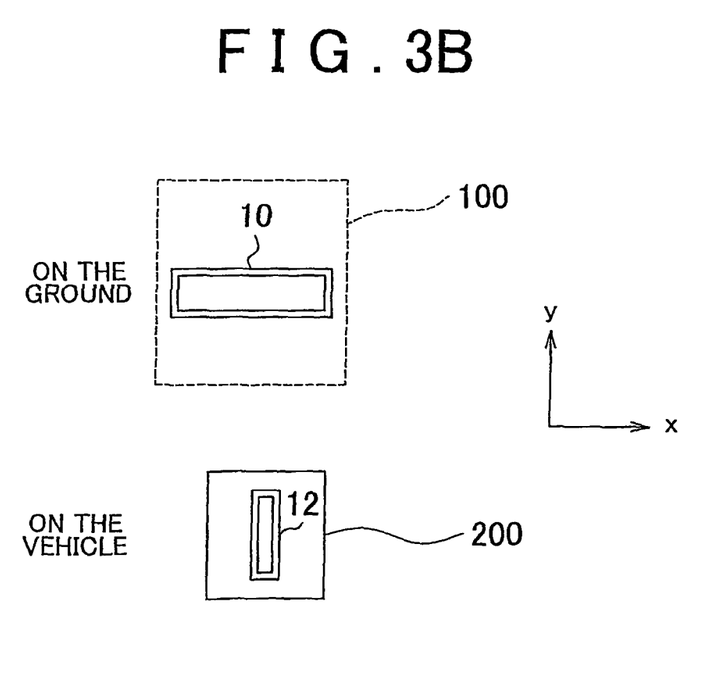
FIG. 3B is a diagram showing another arrangement of the power supply coil and the power receiving coil according to the example embodiment.
Figure 3C:
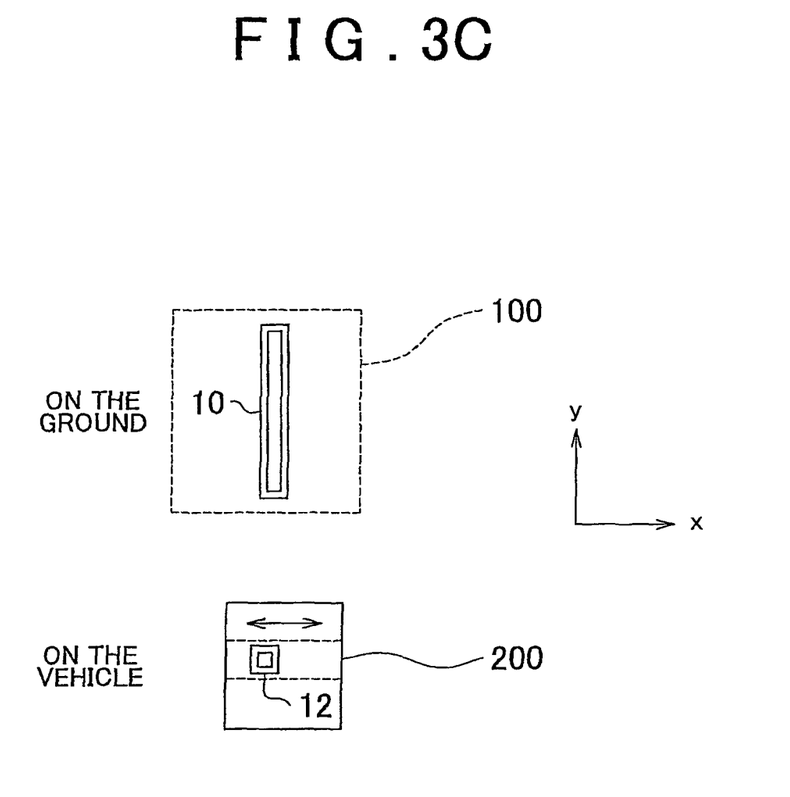
FIG. 3C is a diagram showing yet another arrangement of the power supply coil and the power receiving coil according to the example embodiment.

FIGS. 3A to 3C show specific shapes of the power supply coil 10 and the power receiving coil 12. The power supply coil 10 is provided on the ground in the specified area 100 of the power supply station, while the power receiving coil 12 is provided on the vehicle 200 which is to park in the specified area 100. FIGS. 3A to 3C all show examples in which the power supply coil 10 is embedded in the specified area 100 and the power receiving coil 12 is mounted to the underneath of the vehicle 200. In FIG. 3A, the sectional area of the power supply coil 10 is smaller than the specified area 100, and the power supply coil 10 has a rectangular shape in which one side is longer than another side when viewed from the direction of the coil axis. As shown in the drawing, when two axes that are at right angles to each other are designated direction x and direction y, the power supply coil 10 is longer in direction y than it is in direction x. The length of the power supply coil 10 in direction y may be approximately equal to the length of the specified area 100 in direction y, or slightly shorter. The power supply coil 10 extends almost the entire length of the specified area 100 in direction y. Meanwhile, the power receiving coil 12 has a rectangular shape and is longer in direction x than it is in direction y when viewed from the direction of the coil axis. In this way, both the power supply coil 10 and the power receiving coil 12 are rectangular when viewed from the direction of the coil axis, with the length direction of one being perpendicular to the length direction of the other. As a result, regardless of how the vehicle 200 is parked in the specified area 100, at least a portion of the power receiving coil 12 will overlap with the power supply coil 10.

Also, in FIG. 3B, the sectional area of the power supply coil 10 is smaller than the specified area 100, and the power supply coil 10 has a rectangular shape in which one side is longer than another side when viewed from the direction of the coil axis. As shown in the drawing, when two axes that are at right angles to each other are designated direction x and direction y, the power supply coil 10 is longer in direction x than it is in direction y. The power supply coil 10 extends almost the entire length of the specified area 100 in direction x. Meanwhile, the power receiving coil 12 has a rectangular shape and is longer in direction y than it is in direction x. In this way, both the power supply coil 10 and the power receiving coil 12 are rectangular when viewed from the direction of the coil axis, with the length direction of one being perpendicular to the length direction of the other. As a result, regardless of how the vehicle 200 is parked in the specified area 100, at least a portion of the power receiving coil 12 will overlap with the power supply coil 10.

Also, in FIG. 3C, the sectional area of the power supply coil 10 is smaller than the specified area 100, and the power supply coil 10 has a rectangular shape in which one side is longer than another side when viewed from the direction of the coil axis. As shown in the drawing, when two axes that are at right angles to each other are designated direction x and direction y, the power supply coil 10 is longer in direction y than it is in direction x. Meanwhile, the power receiving coil 12 has a square shape in which the length in direction x is equal to the length in direction y, and is movable in direction x. As a result, regardless of how the vehicle 200 is parked in the specified area 100, at least a portion of the power receiving coil 12 can be made to overlap with the power supply coil 10 by moving the power receiving coil 12 in direction x. Incidentally, in FIG. 3C, the power receiving coil 12 is initially positioned on the central axis in the longitudinal direction of the vehicle 200 when the vehicle 200 first parks in the specified area 100. Then the power receiving coil 12 moves back and forth in direction x while AC power is supplied to the power supply coil 10 in search of the position with the best efficiency. Once the power receiving coil 12 finds that position, it stops moving.

In all of FIGS. 3A to 3C, the power supply frequency is set to match, or come close to, the resonant frequency. The efficiency is first measured with the power supply frequency initially set to the resonant frequency. Then the efficiency is measured after increasing and decreasing the power supply frequency in minute increments in search of the frequency with the best efficiency. The frequency yielding the best efficiency is used as the power supply frequency. The search range of the power supply frequency can be sufficiently limited by making the resonant frequencies of the power supply coil 10 and the power receiving coil 12 the same, and arranging the power supply coil 10 and the power receiving coil 12 in the positions shown in FIGS. 3A to 3C. A power supply frequency search range of approximately ±0.5 MHz is sufficient, as is evident from FIG. 2.

FIGS. 3A to 3C all show the power supply coil 10 embedded in the specified area 100 of the power supply station, and the power receiving coil 12 provided on the underneath of the vehicle 200 so as to face the power supply coil 10, as described above. Of course, this type of arrangement is only one example. Other arrangements are also possible.

Figure 4A:
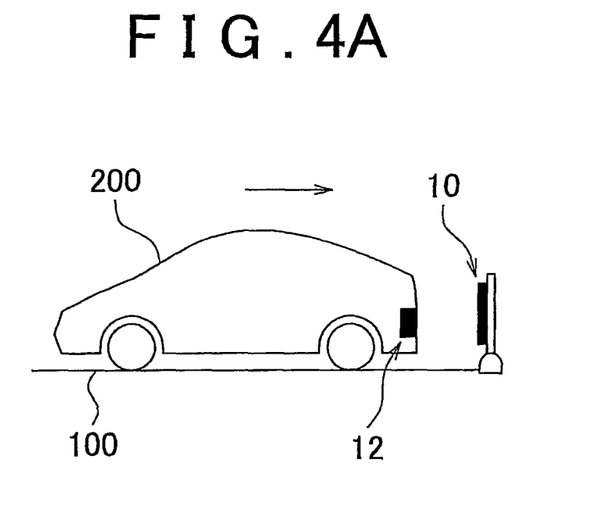
FIG. 4 is a view illustrating one arrangement of the power supply coil and the power receiving coil according to the example embodiment.
Figure 4B:
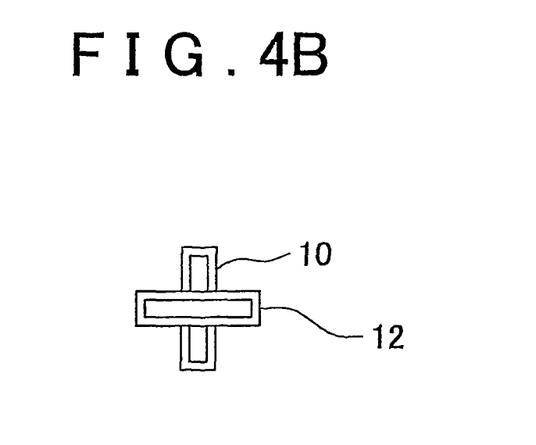
Figure 5A:
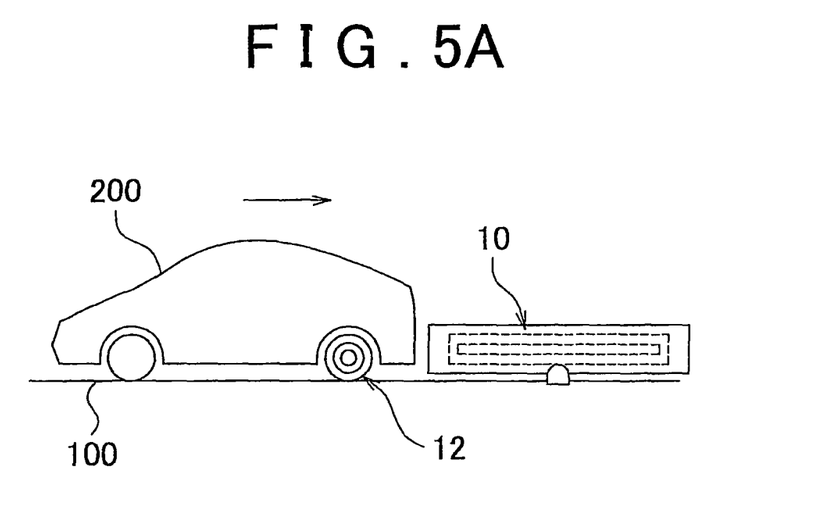
FIG. 5 is a view illustrating another arrangement of the power supply coil and the power receiving coil according to the example embodiment.

FIGS. 4 and 5 are views of other arrangements of the power supply coil 10 and the power receiving coil 12. In FIG. 4, a support plate stands upright on the edge of the specified area 100 of the power supply station, and the power supply coil 10 is provided on this support plate. The power supply coil 10 has a rectangular shape in which it is long in the vertical direction and short in the horizontal direction. Meanwhile, the power receiving coil 12 is provided at a rear portion of the vehicle 200 in a position generally the same height as the power supply coil 10. The power receiving coil 12 also has a rectangular shape in which it is short in the vertical direction and long in the horizontal direction. Therefore, when the vehicle 200 backs into the specified area 100 and the rear portion of the vehicle 200 comes close to the support plate, the power receiving coil 12 overlaps the power supply coil 10 in the shape of a cross, as shown in FIG. 4B. This is equivalent to the arrangement shown in FIG. 1A.

Figure 5B:
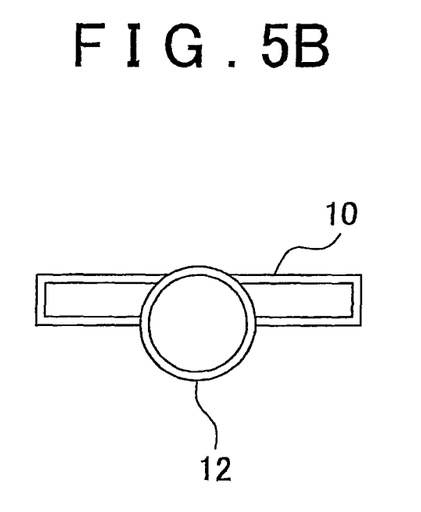

Also, In FIG. 5, a support plate stands upright along the side of the vehicle in the specified area 100 of the power supply station, and the power supply coil 10 is provided on this support plate. The power supply coil 10 has a rectangular shape in which it is long in the horizontal direction and short in the vertical direction. The power supply coil 10 is provided at generally the same height as a wheel of the vehicle 200. Meanwhile, the power receiving coil 12 is provided on a wheel of the vehicle 200. The power receiving coil 12 has a generally circular shape. Therefore, when the vehicle 200 enters the specified area 100, the power receiving coil 12 will overlap with the power supply coil 10 as shown in FIG. 5B.

In this way, with this example embodiment, the power supply coil 10 is provided in the specified area 100 and the power receiving coil 12 is provided on a movable body such as a vehicle. Moreover, the resonant frequency of the power receiving coil 12 is set to be the same as the resonant frequency of the power supply coil 10. When the movable body has parked in the specified area 100, the power receiving coil 12 overlaps with or comes near the power supply coil 10 when viewed from the direction of the coil axis, thereby enabling power to be supplied efficiently. The AC power from the power supply coil 12 is rectified by a rectifier and supplied to a secondary battery mounted in the vehicle 200 to charge the secondary battery. The vehicle 200 may be provided with a charge control apparatus which monitors the state-of-charge (SOC) of the secondary battery. This charge control apparatus may notify the user of the vehicle 200 when it detects that the secondary battery is fully charged, or it may notify the power supply station via wireless communication and stop the supply of power to the power supply coil 10 when it detects that the secondary battery is fully charged.

In this example embodiment, the power supply coil 10 and the power receiving coil 12 both have oval shapes as shown in FIGS. 1A to 1C, rectangular or square shapes as shown in FIGS. 3A to 3C, or circular shapes as shown in FIG. 5, but the invention is not limited to this. That is, the power supply coil 10 and the power receiving coil 12 may have other shapes. For example, in FIG. 3C the power supply coil 10 may be square and the power receiving coil 12 may be rectangular. Also, in FIG. 3C the power receiving coil 12 may be circular or oval-shaped.

Figure 6:
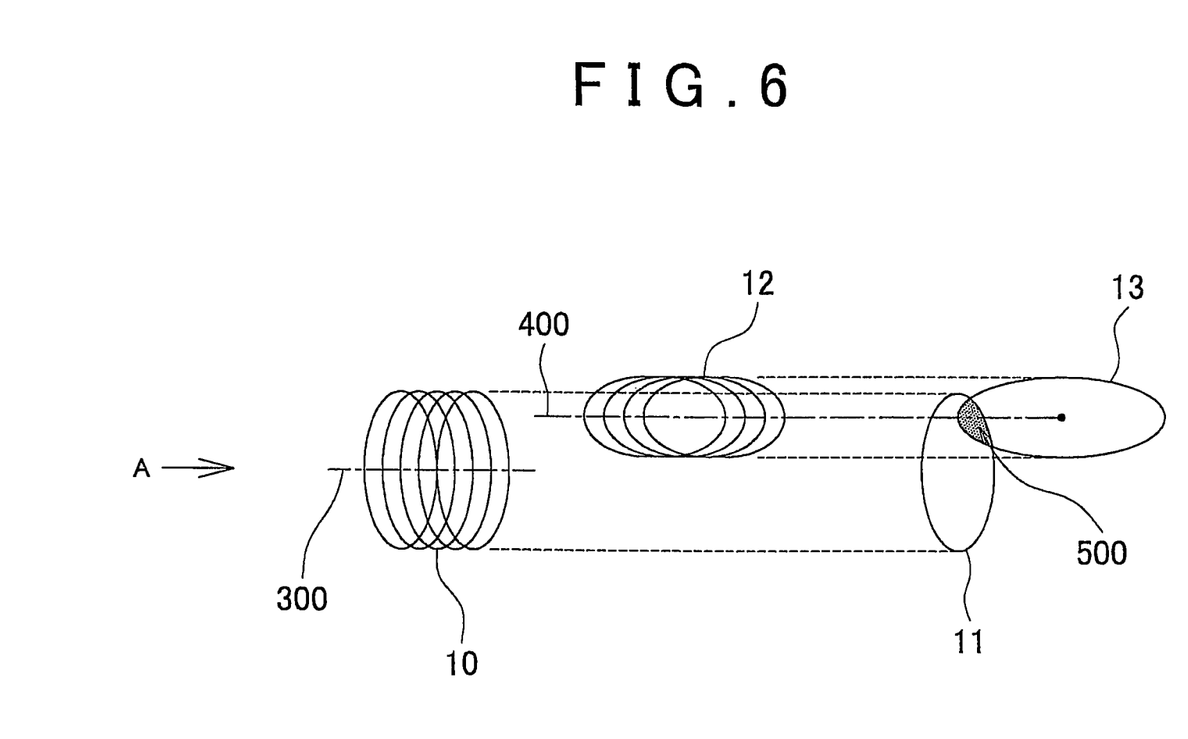
FIG. 6 is view illustrating an arrangement of the power supply coil and the power receiving coil according to the example embodiment.

In this example embodiment, the arrangement of the power supply coil 10 and the power receiving coil 12 is described as viewed from the direction of the coil axis. FIG. 6 is a view showing an example of the direction of the coil axis. When the axis 300 of the power supply coil 10 is parallel with the axis 400 of the power receiving coil 12, direction A which is parallel to the axis 300 and the axis 400 corresponds to the direction of the view from the direction of the coil axis. The oval shape 11 represents a projection of the power supply coil 10 in the direction of the coil axis, and the oval shape 13 represents a projection of the power receiving coil 12 in the direction of the coil axis. FIGS. 1A to 1C and 3A to 3C represent projections of the power supply coil 10 and the power receiving coil 12. With these projections, the power supply coil 10 and the power receiving coil 12 may be said to be overlapping each other when viewed from the direction of the coil axis when there is a partially overlapping portion 500.

Incidentally, in the example embodiment described above, the power supply coil has a rectangular shape, but it may also have a closed shape with a long axis and a short axis when viewed from the direction of the coil axis. This kind of shape includes an oblong shape, a rectangular shape with rounded corners, a guitar shape, a ball shape, an elongated hexagonal shape, and an elongated diamond shape, among others, in addition to a rectangular shape. Moreover, the power receiving coil is also not limited to having a square, circular, or oval shape as described above. That is, the power receiving coil may alternatively have a shape with a long axis that is shorter than the long axis of the power supply coil when viewed from the direction of the coil axis, or a regular polygon shape, or a circular shape.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A power supply system comprising:
a power supply coil provided in a specified area of a facility; and
a power receiving coil which has the same resonant frequency as the power supply coil and is provided on a movable body,
wherein when the movable body is positioned within the specified area, the power receiving coil faces the power supply coil, and the power receiving coil overlaps with or is near the power supply coil when viewed from the direction of the coil axis
and wherein the power supply coil has a shape with a long axis and a short axis when viewed from the direction of the coil axis; the power receiving coil has a shape with a long axis and a short axis when viewed from the direction of the coil axis; and the power supply coil and the power receiving coil are arranged so as to intersect each other when viewed from the direction of the coil axis when the movable body is positioned inside the specified area.

2. The power system according to claim 1, wherein the power receiving coil has a shape in which the long axis is shorter than the long axis of the power supply coil when viewed from the direction of the coil axis; and the power supply coil and the power receiving coil are arranged such that the power receiving coil overlaps with or is near the power supply coil when viewed from the direction of the coil axis when the movable body is in the specified area.

3. The power supply system according to claim 1, wherein the power supply coil has a regular polygon shape or a circular shape; and the power supply coil and the power receiving coil are arranged such that the power receiving coil overlaps with or is near the power supply coil when viewed from the direction of the coil axis when the movable body is in the specified area and wherein the power supply coil has a shape with a long axis and a short axis when viewed from the direction of the coil axis; and the power receiving coil is provided on the movable body so as to be able to move in a direction that intersects the direction of the long axis of the power supply coil.

4. The power supply system according to claim 1, wherein the power supply coil is provided embedded in the specified area, and the power receiving coil is provided on an underneath portion of the movable body.

5. The power supply system according to claim 1, wherein the movable body is a vehicle.

6. The power supply system according to claim 3, wherein the power supply coil is provided embedded in the specified area, and the power receiving coil is provided on an underneath portion of the movable body.

7. The power supply system according to claim 3, wherein the movable body is a vehicle.

* * * * *